(12) United States Patent
Kang

(10) Patent No.: US 6,990,044 B2
(45) Date of Patent: Jan. 24, 2006

(54) COMPOSITE MEMORY DEVICE

(75) Inventor: Hee Bok Kang, Daejeon (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 10/629,745

(22) Filed: Jul. 30, 2003

(65) Prior Publication Data

US 2004/0120206 A1 Jun. 24, 2004

(30) Foreign Application Priority Data

Dec. 18, 2002 (KR) ...................... 10-2002-0081277

(51) Int. Cl.
*G11C 13/04* (2006.01)
(52) U.S. Cl. ............... 365/235; 365/230.03; 365/238.5
(58) Field of Classification Search ........... 365/230.03, 365/238.5, 63, 201, 145, 235, 51
See application file for complete search history.

(56) References Cited

U.S. PATENT DOCUMENTS

| | | | |
|---|---|---|---|
| 4,873,664 A | | 10/1989 | Eaton, Jr. |
| 5,959,914 A | * | 9/1999 | Gates et al. ................ 365/201 |
| 6,079,001 A | * | 6/2000 | Le et al. ..................... 711/167 |
| 6,125,061 A | | 9/2000 | Mitani |
| 6,253,302 B1 | * | 6/2001 | MacWilliams et al. ...... 711/211 |
| 6,266,285 B1 | | 7/2001 | Farmwald et al. |
| 6,314,251 B1 | | 11/2001 | Gomi et al. |
| 6,415,339 B1 | | 7/2002 | Farmwald et al. |
| 6,426,916 B2 | | 7/2002 | Farmwald et al. |
| 6,526,451 B2 | * | 2/2003 | Kasper ........................ 709/250 |
| 6,629,185 B1 | * | 9/2003 | Silver et al. ................. 710/307 |
| 6,762,962 B2 | * | 7/2004 | Nagashima .................. 365/194 |
| 6,765,812 B2 | * | 7/2004 | Anderson ..................... 365/51 |
| 2004/0019762 A1 | * | 1/2004 | Fukuoka et al. ............. 711/203 |
| 2004/0083344 A1 | * | 4/2004 | Watanabe .................... 711/154 |

FOREIGN PATENT DOCUMENTS

| | | |
|---|---|---|
| JP | 07-180655 | 6/1995 |
| KR | 2001-0076518 | 8/2001 |

\* cited by examiner

*Primary Examiner*—Anh Phung
*Assistant Examiner*—Dang T. Nguyen
(74) *Attorney, Agent, or Firm*—Heller Ehrman LLP

(57) ABSTRACT

The present invention relates to a composite memory device comprising first through third memory devices, a memory bus, and first through third memory controllers. The first memory device is an asynchronous memory device, the second memory device is a synchronous memory device configured to operate in a page mode, and the third memory device is a synchronous memory device configured to operate in a burst mode. The first through the third memory controllers are configured to control data transfer operation between the memory bus and the first through the third memory devices, respectively. The first through the third memory devices are controlled by an external memory controller to exchange data with an external system bus, and when one of the first through the third memory devices exchanges data with the external system bus, the rest two memory devices are allowed to exchange data via the memory bus.

15 Claims, 10 Drawing Sheets

COMPOSITE MEMORY DEVICE

BACKGROUND OF THE INVENTION

1. Field of the Invention

The present invention relates to a semiconductor memory device, and more specifically, to a composite memory device comprising an asynchronous memory device configured to operate at high speed, a synchronous memory device configured to operate in a page mode, and a synchronous memory device configured to operate in a burst mode all therein.

2. Description of the Related Art

A high performance system requires various kinds of memory devices each having excellent characteristics in one of performances such as speed and capacity. For example, the high performance system needs a cache memory to exchange data with a CPU at high speed, a nonvolatile memory to store a program, and a synchronous memory with a high-speed burst function to process high-capacity data at high speed. In a conventional system, however, these memories are embodied in separate chips.

FIG. 1 is a block diagram illustrating a conventional memory device.

The conventional system includes an asynchronous SRAM (Static Random Access Memory) 1 for high-speed data processing, a flash memory device 2 as a nonvolatile memory device, and a SDRAM (Synchronous Dynamic Random Access Memory) 3 configured to operate in a burst mode for high-capacity data processing at high speed. These memory devices 1, 2 and 3 share a system bus 4, and they are controlled by the same memory controller 5.

In the conventional system comprising a plurality of memory devices for each performing separate function, a memory controller controls memory devices individually. Therefore, the operation speed decreases because the data transfer operation is controlled at the system level even when data are exchanged among the memory devices, thereby degrading the operation efficiency of the whole system.

SUMMARY OF THE INVENTION

Accordingly, it is an object of the present invention to improve efficiency of a system by embodying an asynchronous memory device, a synchronous memory device configured to operate in a page mode and a synchronous memory device configured to operate in a burst mode on a chip.

It is another object of the present invention to provide a SOC (System On a Chip) device comprising an asynchronous memory device, a synchronous memory device configured to operate in a page mode, a synchronous memory configured to operate in a burst mode, a memory controller and a central processing unit (CPU).

There is provided a composite memory device comprising first through third memory devices, a memory bus, and first through third memory controllers. The first memory device is an asynchronous memory device, the second memory device is a synchronous memory device configured to operate in a page mode, and the third memory device is a synchronous memory device configured to operate in a burst mode. The first through the third memory controllers are configured to control data transfer operation between the memory bus and the first through the third memory devices, respectively. The first through the third memory devices exchange data with an external system bus controlled by an external memory controller, and when one of the first through the third memory devices exchanges data with the external system bus, the rest two memory devices are allowed to exchange data via the memory bus.

BRIEF DESCRIPTION OF THE DRAWINGS

The disclosure will be described in terms of several embodiments to illustrate its broad teachings. References are also made to the attached drawings.

DETAILED DESCRIPTION OF THE PREFERRED EMBODIMENTS

The present invention will be described in detail with reference to the attached drawings.

Figure 1:
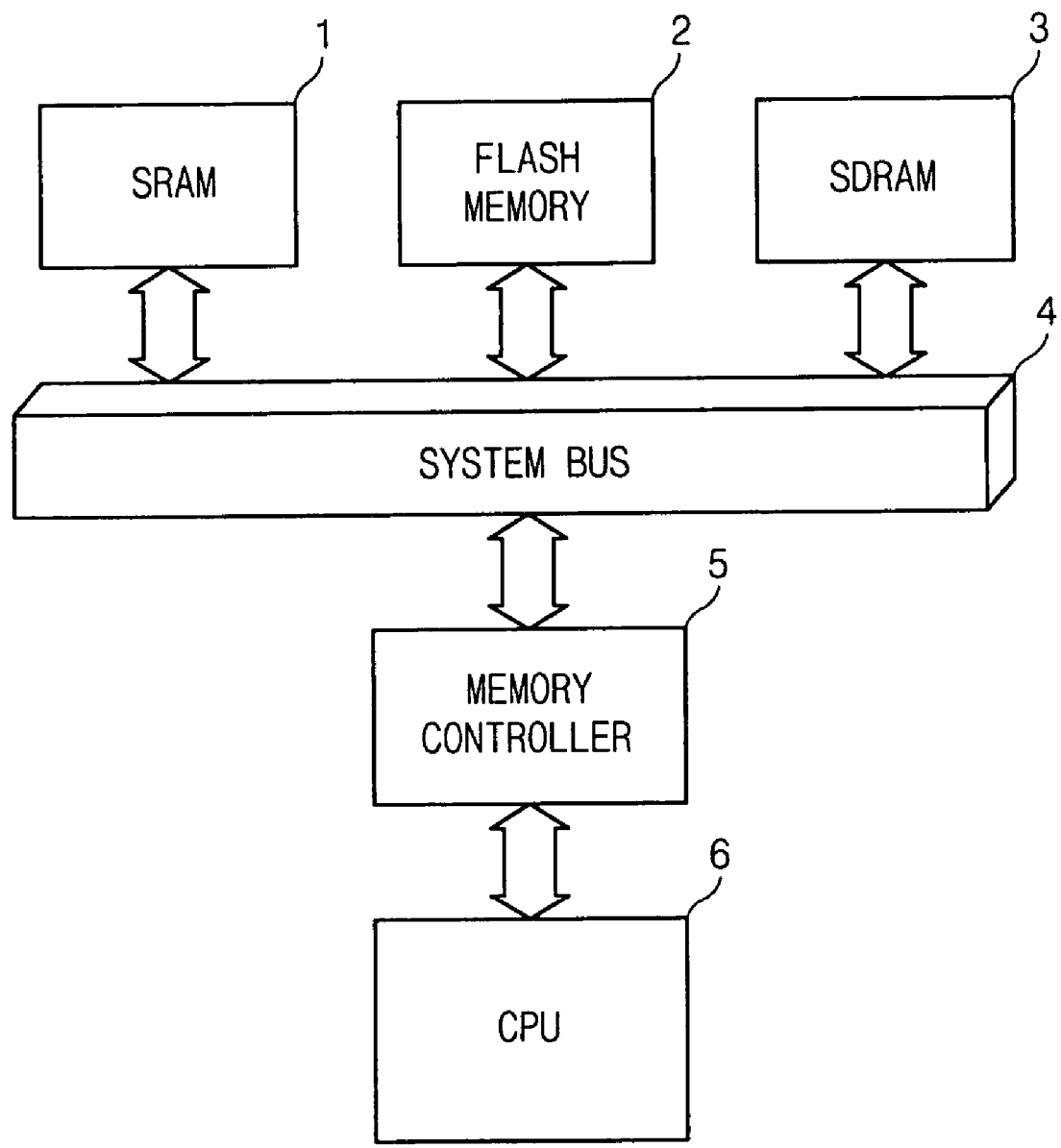
FIG. 1 is a block diagram illustrating a system comprising a conventional memory device.
Figure 2:
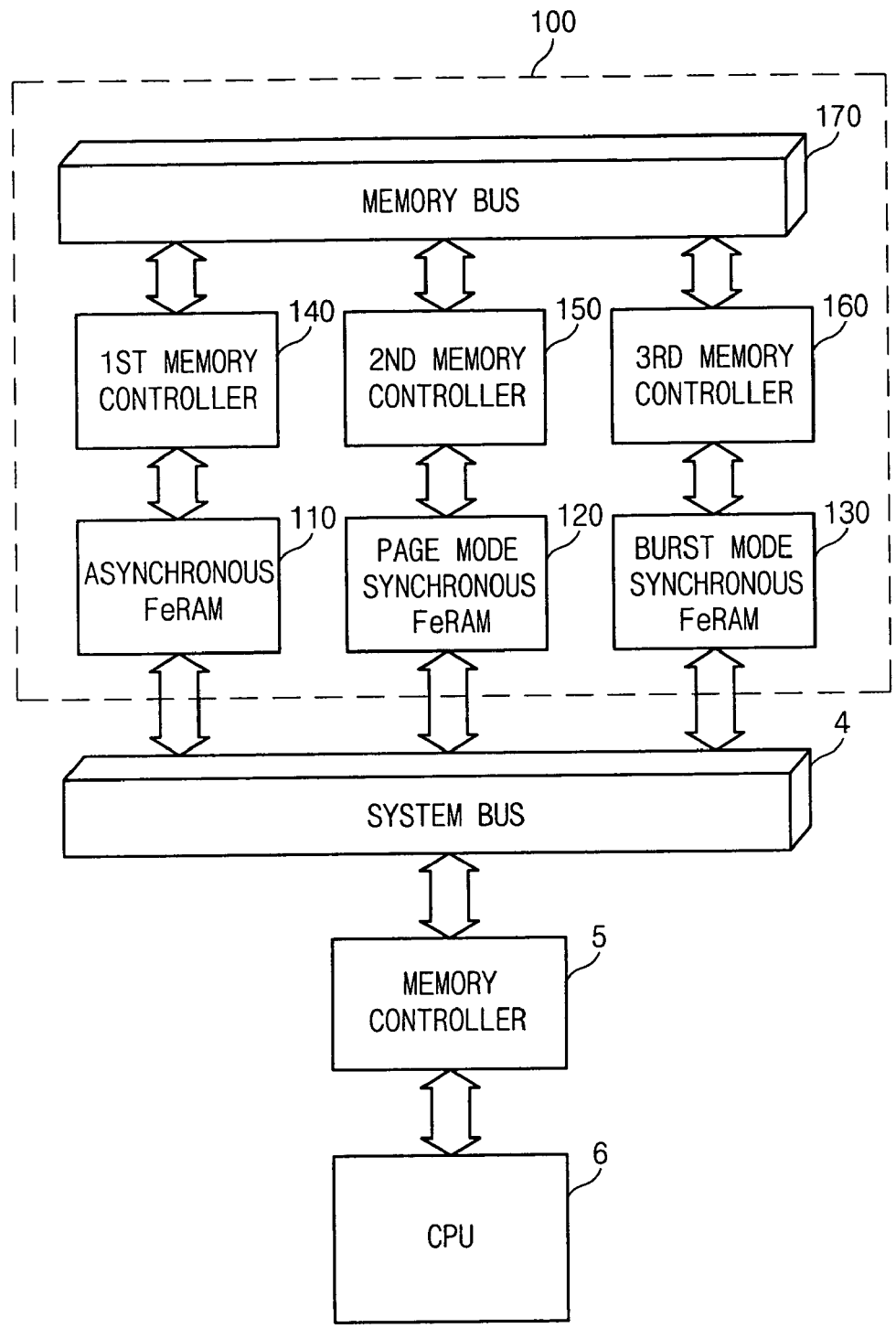
FIG. 2 is a block diagram illustrating an example of a system comprising a composite memory device according to the present invention.

FIG. 2 is a block diagram illustrating an example of a system comprising a composite memory device 100 according to the present invention. The composite memory device 100 comprises a synchronous ferroelectric memory device (hereinafter, referred to as "FeRAM") 110, a page mode synchronous FeRAM 120 and a burst mode synchronous FeRAM 130.

The three memory devices are controlled by a first memory controller 140, a second memory controller 150 and a third memory controller 160, respectively. The FeRAMs 110, 120 and 130 can exchange data via a memory bus 170 included in the composite memory device 100. This data exchange operation is controlled by the memory controllers 140, 150 and 160, respectively.

The FeRAMs 110, 120 and 130 of the composite memory device 100 are connected to a system bus 4 disposed outside the memory device. The system controlled by a central processing unit (CPU) 6 includes a memory controller 5. The memory controller 5 controls the data exchange operation between the composite memory device 100 and the system bus 4.

The memory bus 170 can operate independently of the system bus 4. For example, when the asynchronous FeRAM 110 occupies the system bus 4, the page mode synchronous FeRAM 120 can exchange data with the burst mode synchronous FeRAM 130 via the memory bus 170. Therefore, the operation efficiency of the system increases.

Figure 3A:
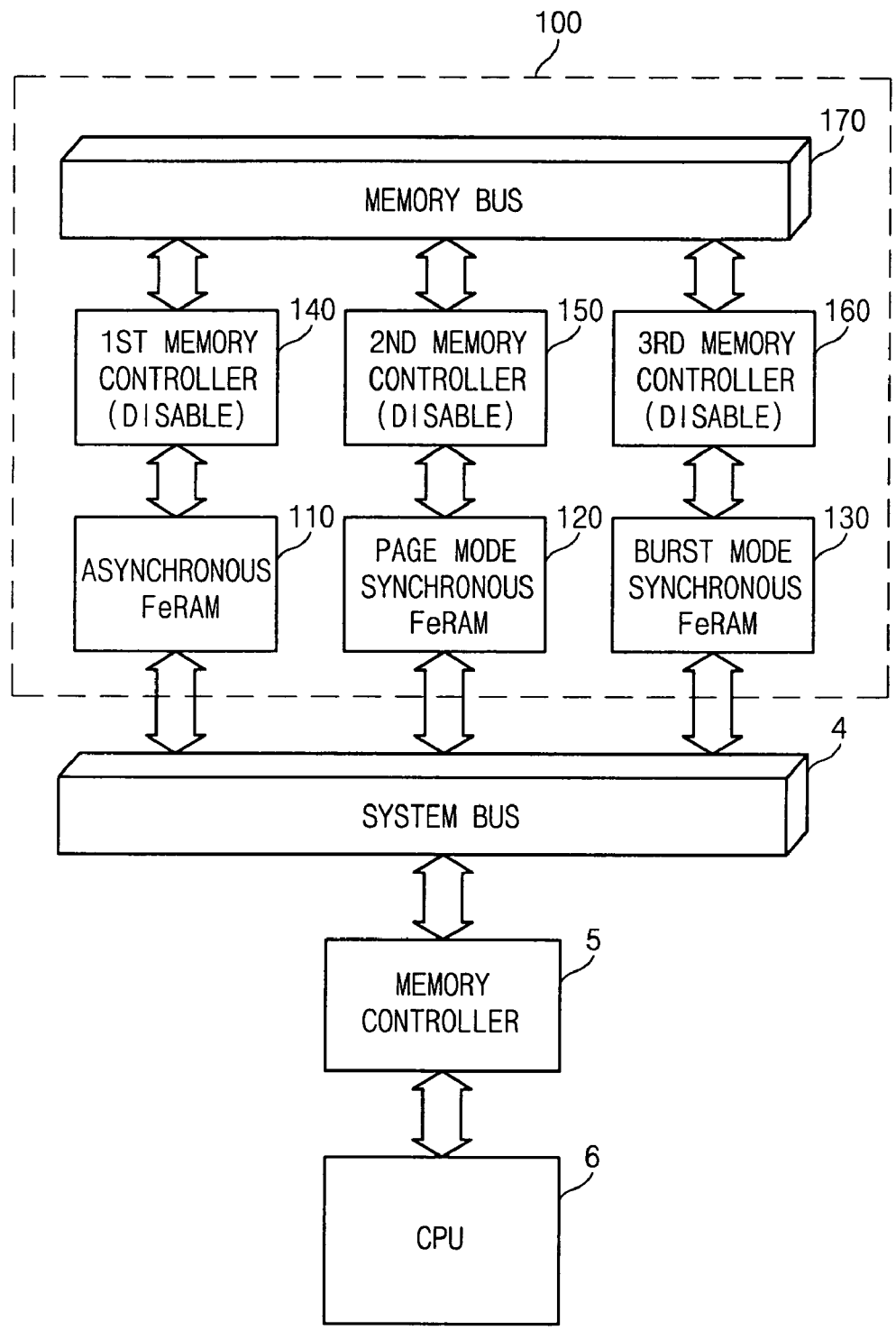
FIGS. 3*a* and 3*b* are block diagrams illustrating a usage of the memory device of FIG. 2.
Figure 3B:
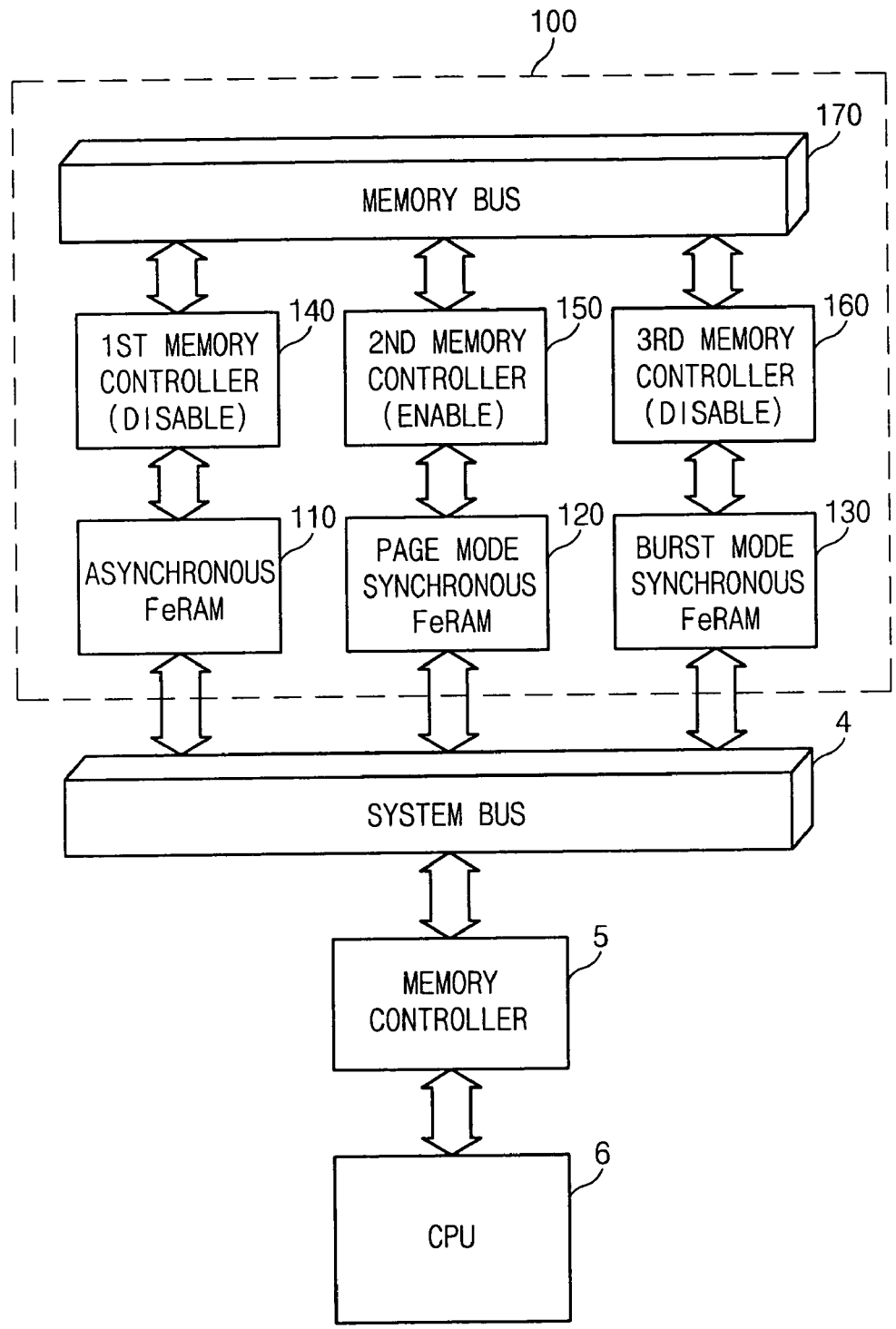

FIGS. 3*a* to 3*c* are block diagrams illustrating the various operations of the controllers 140, 150 and 160 when the system bus 4 and the memory bus 170 are used by the FeRAMs 110, 120 and 130 of FIG. 2.

FIG. 3*a* shows the operation of the first through the third memory controllers 140, 150 and 160 when only the system bus 4 is used in the composite memory device 100. The composite memory device 100 is controlled by the memory controller 5 and occupies the system bus 4.

When the memory bus 170 is not used, the memory controllers 140, 150 and 160 are inactivated.

FIG. 3b shows the operation of the memory controllers 140, 150 and 160 when both the system bus 4 and the memory bus 170 are simultaneously used in the composite memory device 100. The composite memory device 100 is controlled by the memory controller 5 and occupies the system bus 4.

For example, when the system bus 4 is used by the asynchronous FeRAM 110, the first memory controller 140 is inactivated such that the asynchronous FeRAM 110 cannot access the memory bus 170. Here, the page mode synchronous memory controller 140 and the burst mode synchronous memory controller 160 are activated such that the page mode synchronous FeRAM 120 can exchange with the burst mode synchronous FeRAM 130 via the memory bus 170.

Figure 4:
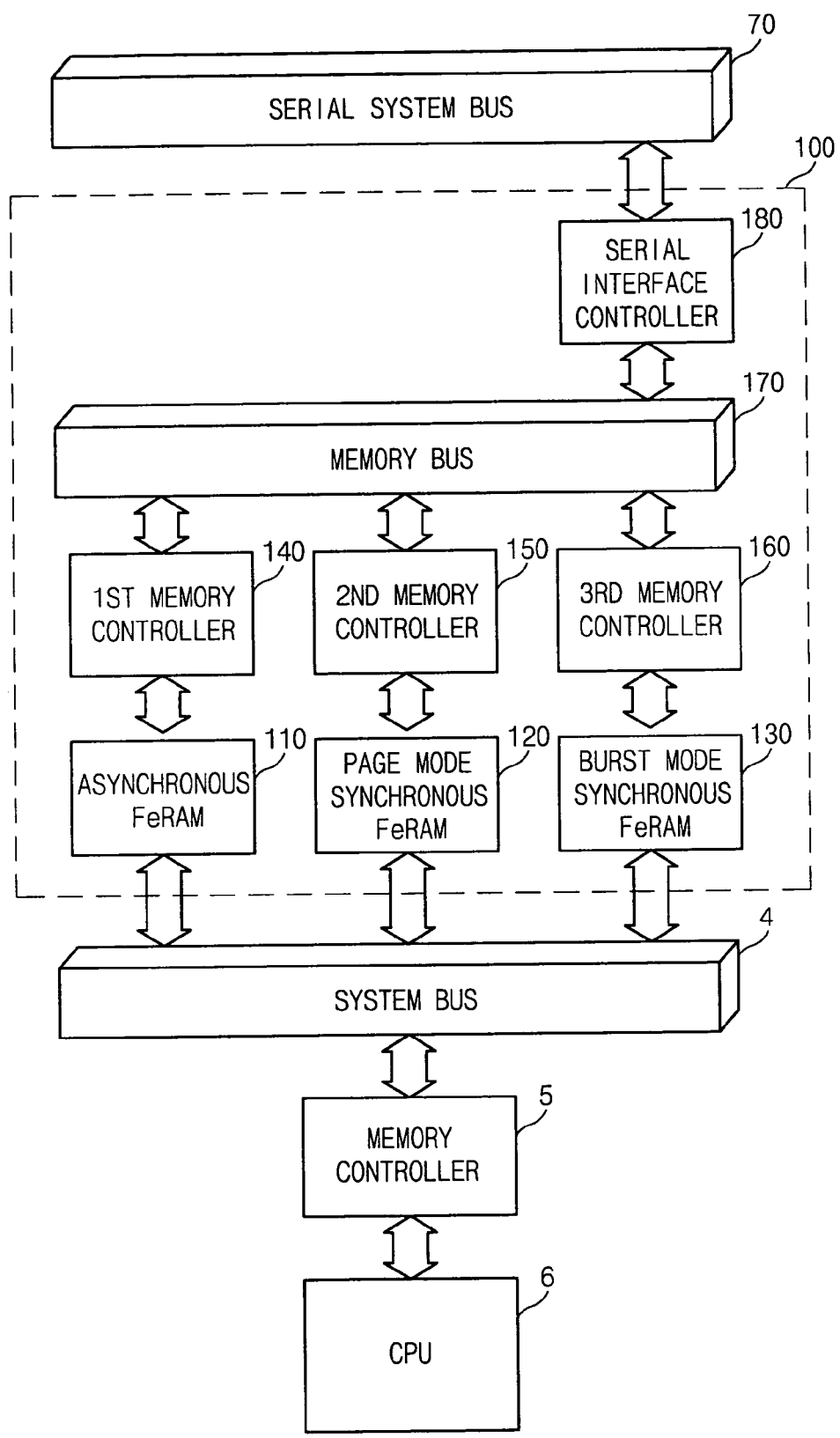
FIG. 4 is a block diagram illustrating another example of a system comprising a composite memory device according to the present invention.

FIG. 4 is a block diagram illustrating another example of a system comprising the composite memory device 100 further including a serial interface controller 180. The serial interface controller 180 can exchange serial data between the memory bus 170 and an external serial system bus 7. The detailed explanation on the other elements of FIG. 4 is omitted because it is the same as those of FIGS. 3a to 3c.

Figure 5A:
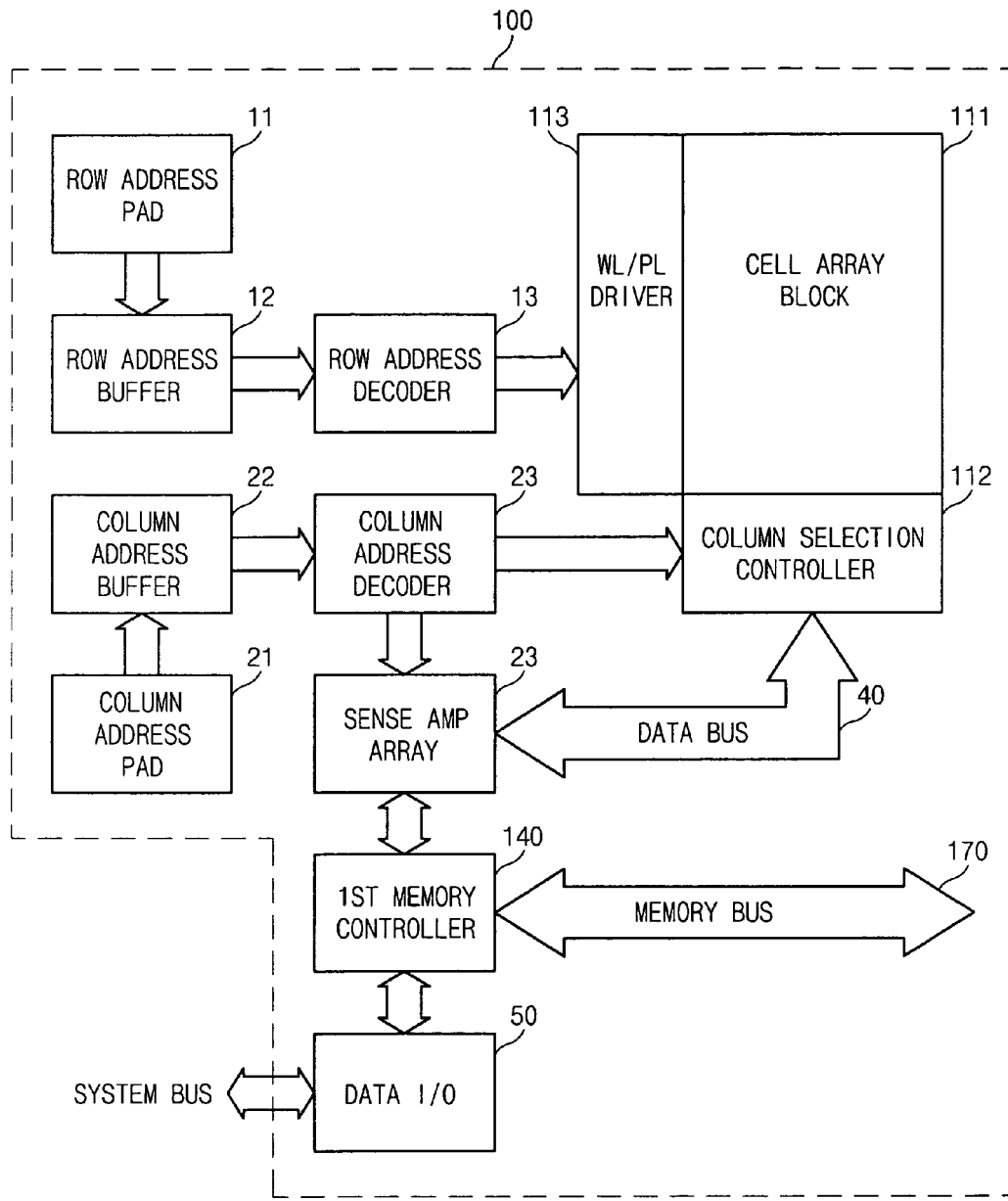
FIGS. 5*a* to 5*c* are block diagrams illustrating first through third memory devices of FIG. 2.
Figure 5B:
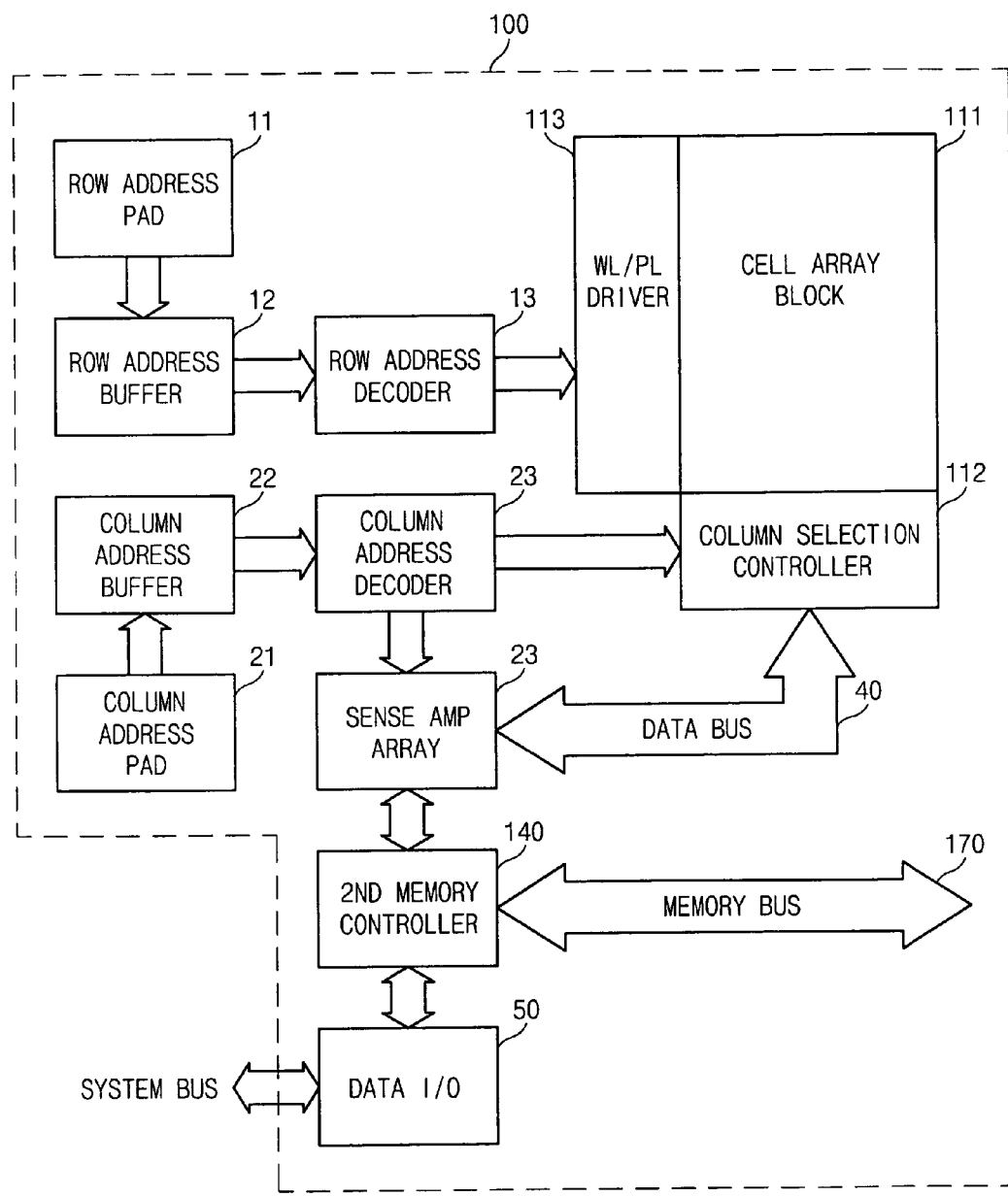
Figure 5C:
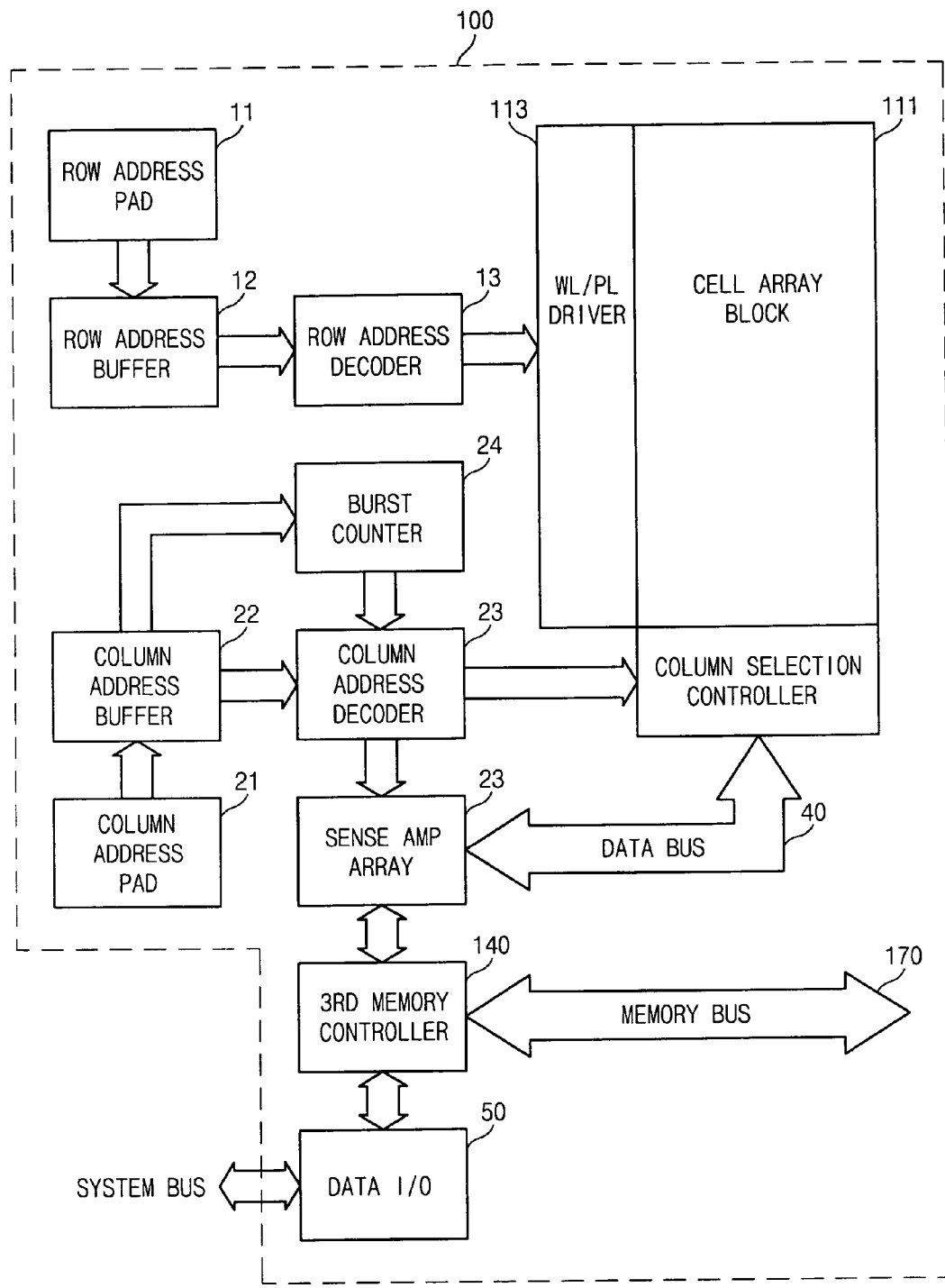

FIGS. 5a to 5c are block diagrams illustrating connectivities among the FeRAMs 110, 120 and 130, the first through the third memory controllers 140, 150 and 160, and other adjacent functional blocks in the composite memory device 100.

FIG. 5a shows connectivities of the asynchronous FeRAM 100, the first memory controller 140 and other adjacent blocks.

The asynchronous FeRAM 110 comprises a cell array block 111 including a plurality of unit cells, a column selection controller 112 for connecting a bitline to a data bus 40 and a wordline/plateline driver 113 for driving a wordline and a plateline.

The wordline/plateline driver 113 is controlled by a row address decoder 13. The row address decoder 13 receives an address, which is inputted in a row address pad 11, from a row address buffer 12 and controls a corresponding wordline/plateline driver 113.

A column address decoder 23 determines which bitline is connected to a data bus by the column selection controller 112. The column address decoder 23 receives an address, which is inputted in a column address pad 21, from a column address buffer 22 to activate a corresponding column selection controller 112.

The column address decoder 23 controls a sense amplifier array 30. Data of the cell array block 111 are transmitted into the sense amplifier array 30 via the data bus 40. The sense amplifier array 30 outputs the data into a system bus 4 via a data I/O buffer 50. Data of the system bus 4 are inputted into the sense amplifier array 30 via the data I/O buffer 50. The sense amplifier array 30 stores the data in the cell array block 111.

The first memory controller 140 is connected between the sense amplifier array 30 and the memory bus 170 and controls data input/output operation between the asynchronous FeRAM 110 and the memory bus 170.

The structures of FIGS. 5b and 5c are not explained because they are the same as that of FIG. 5a except the kinds of the FeRAM 120 and 130, and the memory controllers 150 and 160. However, the burst mode synchronous FeRAM 130 of FIG. 5c comprises an additional element to control column addresses. Since high-capacity data are stored in consecutive addresses, data can be processed at high speed if the column address is consecutively changed in a predetermined row address. A bust counter 24 serves to change the column address consecutively. The column address decoder 23 receives a column address from the burst counter 24 to control a column selection controller 132. Other structures and functions of FIGS. 5b and 5c are the same as those of FIG. 5a.

Figure 6:
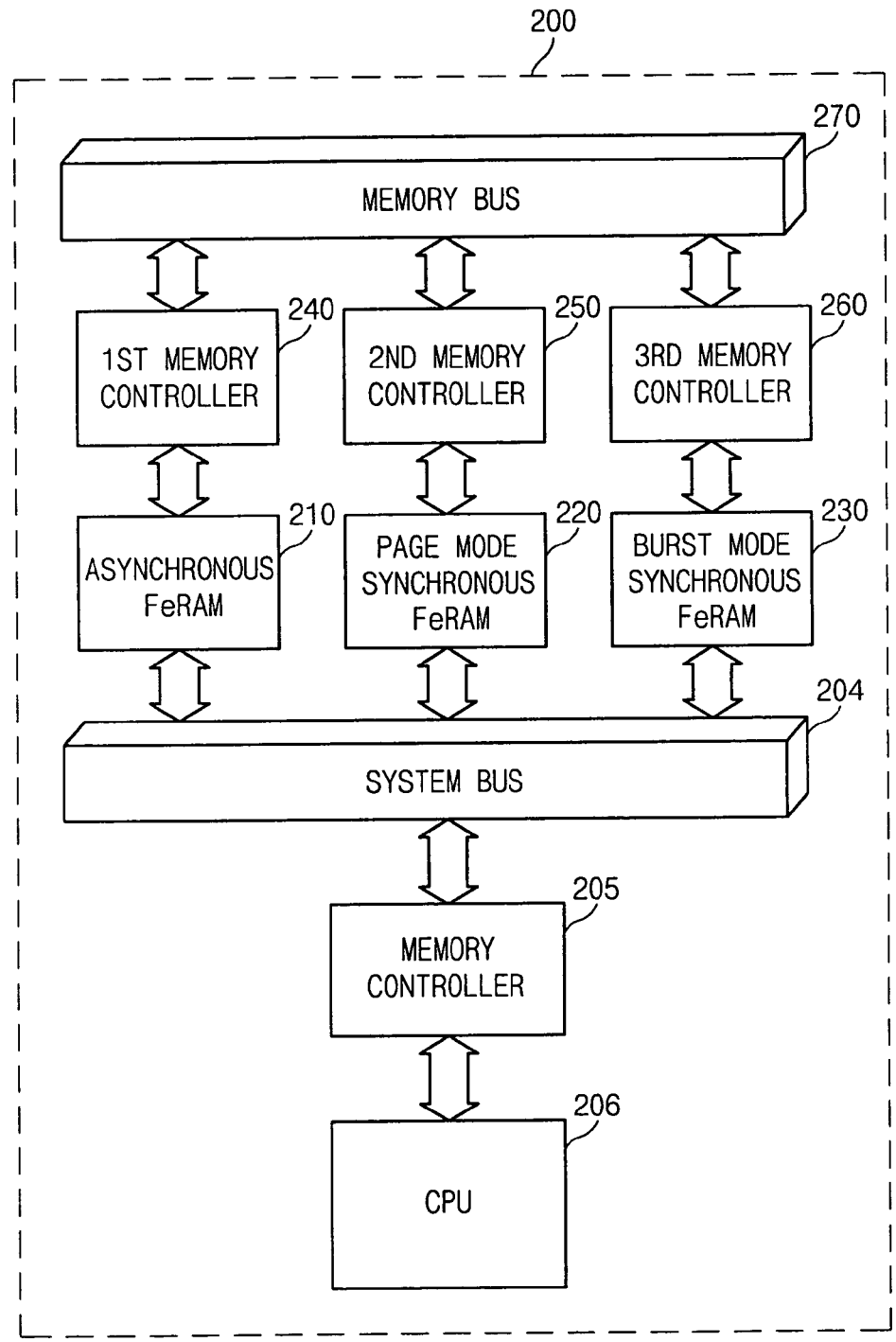
FIG. 6 is a block diagram illustrating an example of a SOC device.

FIG. 6 is a block diagram illustrating an example of a SOC (System On a Chip) device 200. In the example of the SOC device 200, the memory region 100, the system bus 4, the memory controller 5 and the CPU 6 of FIG. 2 are all embodied in a chip.

The SOC composite memory device 200 comprises a synchronous FeRAM 210, a page mode synchronous FeRAM 220 and a burst mode synchronous FeRAM 230. The memory bus 270 serves to exchange data among the FeRAMs 210, 220 and 230. The FeRAM 210, 220 and 230 are controlled correspondingly by first through third memory controllers 240, 250 and 260 and exchange data with the memory bus 270. In addition, the SOC device 200 comprises a system bus 204, a memory controller 205 and a CPU 206. The CPU 206 allows the memory controller 205 to control the FeRAMs 210, 220 and 230. The FeRAMs 210, 220 and 230 exchange data with external blocks via the system bus 204.

As described above, the FeRAMs 210, 220 and 230 can use both the system bus 204 and the memory bus 270 simultaneously. For example, when the asynchronous FeRAM 210 uses the system bus 204, the page mode synchronous FeRAm 220 can exchange data via the memory bus 270 with the burst mode synchronous FeRAM 230. Here, the first memory controller 240 is inactivated, and the second and the third memory controllers 250 and 269 are activated.

Figure 7:
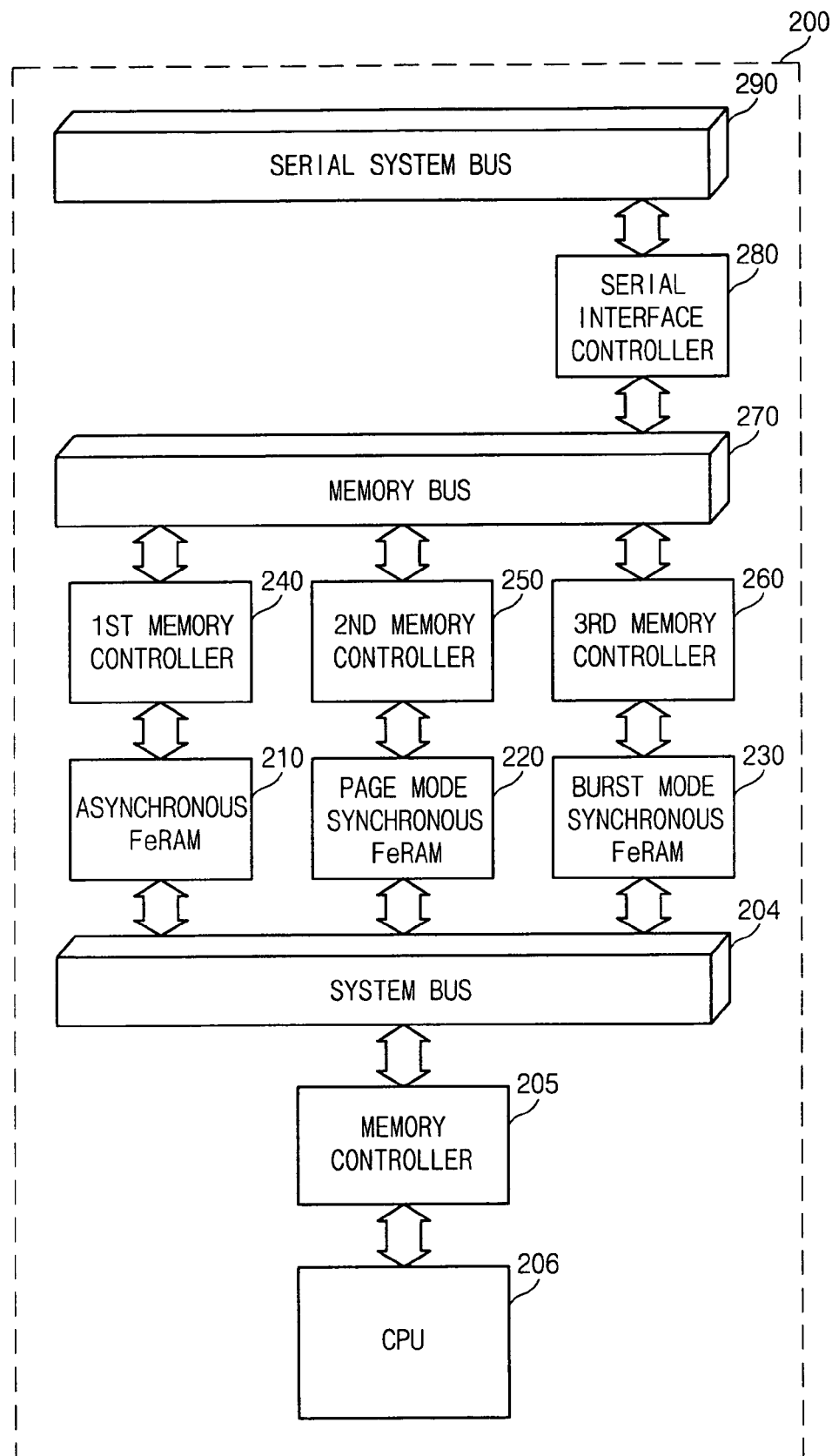
FIG. 7 is a block diagram illustrating another example of a SOC device.

FIG. 7 is a block diagram illustrating another example of the SOC device 200 further comprising a serial interface controller 280 and a serial system bus 290. The serial interface controller 280 allows the memory bus 270 to exchange data with the serial system bus 290. Additional explanation of other elements is omitted because they are the same as those of FIG. 6.

Although FeRAMs are used in the above-described embodiments, other kinds of memory devices may be used. For example, flash memory, MRAM (Magnetic RAM) or PRAM (Phase Change RAM) technologies can be applied to the memory device. In addition, each memory device can be embodied using various types of technologies. For example, the asynchronous memory devices 110 and 210 may be embodied using SRAM technology, the page mode synchronous memory devices 120 and 220 using FeRAM technology, and the burst mode synchronous memory devices using SDRAM (Synchronous DRAM) technology.

As discussed earlier, a disclosed composite memory device comprises a high-speed asynchronous memory device, a nonvolatile memory device for memorizing system setting information, a synchronous memory device for processing high-capacity data in a chip and allows internal memory devices to exchange data via a memory bus to improve the efficiency of the whole system.

What is claimed is:

1. A composite memory device, comprising:
   a first asynchronous memory device;
   a second synchronous memory device configured to operate in a page mode;

a third synchronous memory device configured to operate in a burst mode;

a memory bus configured to transfer data among the first through the third memory devices;

a first memory controller configured to control data transfer operation between the first memory device and the memory bus;

a second memory controller configured to control data transfer operation between the second memory device and the memory bus; and a third memory controller configured to control data transfer operation between the third memory device and the memory bus, wherein the first through the third memory devices are controlled by an external memory controller to exchange data with an external system bus, and when one of the first through the third memory devices exchanges data with the external system bus, the rest two memory devices are allowed to exchange data via the memory bus.

2. The device according to claim 1, further comprising a serial interface controller configured to control data transfer operation between the memory bus and an external serial system bus.

3. A composite memory device, comprising:

a first asynchronous memory device;

a second synchronous memory device configured to operate in a page mode;

a third synchronous memory device configured to operate in a burst mode;

a memory bus configured to transfer data among the first through the third memory devices;

a first memory controller configured to control data transfer operation between the first memory device and the memory bus;

a second memory controller configured to control data transfer operation between the second memory device and the memory bus;

a third memory controller configured to control data transfer operation between the third memory device and the memory bus;

a central processing unit;

a system bus configured to transfer data among the central processing unit and the first through the third memory devices; and a memory controller configured to control data transfer operation between the system bus and a memory device among the first through the third memory devices and controlled by the central processing unit, wherein the first through the third memory devices are controlled by an external memory controller to exchange data with an external system bus, and when one of the first through the third memory devices exchanges data with the external system bus, the rest two memory devices are allowed to exchange data via the memory bus.

4. The device according to claim 3, further comprising:

a serial system bus configured to receive serial data; and a serial interface controller configured to control data transfer operation between the memory bus and the serial system bus.

5. The device according to one of claims 1 to 4, wherein the first memory device is a ferroelectric memory device.

6. The device according to claim 5, wherein the first memory device comprises:

a cell array block including a plurality of cells arranged be a mains format, each cell connected to a wordline, a plateline and a bitline;

a driver configured to drive the wordline and the plateline in response to a row address decoder;

a column selection controller configured to connect a data bus to the bitline in response to a column address decoder;

a data I/O buffer connected to the system bus; and a sense amplifier array configured to control data input/output operation between the data bus and the data I/O buffer in response to the column address decoder, wherein the first memory controller is connected between the sense amplifier array and the memory bus and controls data exchange operation between the cell array block and the memory bus.

7. The device according to one of claims 1 to 4, wherein the second memory device is a ferroelectric memory device.

8. The device according to claim 7, wherein the second memory device comprises:

a cell array block including a plurality of cells arranged as a matrix format, each cell connected to a wordline, a plateline and a bitline;

a driver configured to drive the wordline and the plateline in response to a row address decoder, a column selection controller configured to connect a data bus to the bitline in response to a column address decoder;

a data I/O buffer connected to the system bus; and a sense amplifier array configured to control data input/output operation between the data bus and the data I/O buffer in response to the column address decoder, wherein the second memory controller is connected between the sense amplifier array and the memory bus and controls data exchange operation between the cell ray block and the memory bus.

9. The device according to one of claims 1 to 4, wherein the third memory device is a ferroelectric memory device.

10. The device according to claim 9, wherein the third memory device comprises:

a cell array block including a plurality of cells arranged as a matrix format, each cell connected to a wordline, a plateline and a bitline;

a burst counter configured to receive a column address from a column address buffer and to control a column address decoder so tat the column address may increase consecutively;

a driver configured to drive the wordline and the plateline in response to the column address decoder;

a column selection controller configured to connect a data bus to the bitline in response to the column address decoder;

a data I/O buffer connected to the system bus; and a sense amplifier array configured to control data input/output operation between the data bus and the data I/O buffer in response to the column address decoder, wherein the third memory controller is connected between the sense amplifier array and the memory bus and controls data exchange operation between the cell array block and the memory bus.

11. The device according to one of claims 1 to 4, wherein the first through the third memory devices are a ferroelectric memory device.

12. The device according to one of claims 1 to 4, wherein the first through the third memory devices are MRAMs (Magnetic Random Access Memory).

13. The device according to one of claims 1 to 4, wherein the first through the third memory devices are PRAMs (Phase Change Random Access Memory).

14. The device according to one of claims 1 to 4, wherein the second memory device is a flash memory device.

15. A composite memory device, comprising:
- a plurality of memory devices configured to operate individually;
- a memory bus configured to transfer data among the plurality of memory devices; and
- a plurality of memory controllers configured to control data transfer operation between the memory bus and a memory device among the plurality of the memory devices respectively, wherein the plurality of memory devices are controlled by an external memory controller to exchange data with an external system bus, and when one of the plurality of memory devices exchanges data with the external system bus, the rest memory devices are allowed to exchange data via the memory bus.

* * * * *